(12) United States Patent
Bendicks et al.

(10) Patent No.: US 6,867,581 B1
(45) Date of Patent: Mar. 15, 2005

(54) SENSOR DEVICE FOR DETECTING A PHYSICAL MEASURED QUANTITY

(75) Inventors: Norbert Bendicks, Hemer (DE); Detlef Kerkmann, Nachrodt (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 82 days.

(21) Appl. No.: 09/857,551

(22) PCT Filed: Dec. 15, 1999

(86) PCT No.: PCT/EP99/09943

§ 371 (c)(1),
(2), (4) Date: Jun. 6, 2001

(87) PCT Pub. No.: WO00/39530

PCT Pub. Date: Jul. 6, 2000

(30) Foreign Application Priority Data

Dec. 23, 1998 (DE) .......................... 198 59 828

(51) Int. Cl.[7] .................. G01R 33/02; G01R 33/06
(52) U.S. Cl. .................. 324/207.13; 324/207.21
(58) Field of Search ............... 324/202, 207.13, 324/207.12, 326, 225, 207.2, 207.21

(56) References Cited

U.S. PATENT DOCUMENTS

| | | | |
|---|---|---|---|
| 4,084,135 A | * | 4/1978 | Enabnit ................ 324/202 |
| 4,491,794 A | * | 1/1985 | Daley et al. ............. 324/228 |
| 4,514,687 A | * | 4/1985 | Van Husen ............. 324/537 |
| 5,334,933 A | | 8/1994 | Tellerman |
| 5,343,145 A | * | 8/1994 | Wellman et al. ......... 324/202 |
| 5,495,112 A | | 2/1996 | Maloney et al. |
| 5,809,406 A | | 9/1998 | Taki et al. |

FOREIGN PATENT DOCUMENTS

| | | |
|---|---|---|
| DE | 41 33 837 | 4/1993 |
| DE | 196 02 243 | 7/1997 |
| EP | 0 605 326 | 7/1994 |
| GB | 2043258 | 10/1980 |

* cited by examiner

*Primary Examiner*—John Barlow
*Assistant Examiner*—Toan M. Le
(74) *Attorney, Agent, or Firm*—Brooks Kushman P.C.

(57) ABSTRACT

A sensor device for measuring a physical value includes a sensor element for generating an output signal in response to measuring a physical value. A processor is operable with the sensor element for comparing the output signal to a reference signal in order to generate a primary signal indicative of the measured physical value. The processor is further operable with the sensor element for generating a secondary signal based on the output signal which is indicative of the operating condition of the sensor device. A switch or logic block is operable for receiving the primary and secondary signals from the processor. The switch and the logic block are switchable between a first state in which the primary signal is output and a second state in which the secondary signal is output.

10 Claims, 2 Drawing Sheets

SENSOR DEVICE FOR DETECTING A PHYSICAL MEASURED QUANTITY

TECHNICAL FIELD

1. Field of the Invention

The invention is based on a sensor for recording a measured physical value, with an output, through which the measured value is sent out as a digital or analog signal.

2. Background Art

Magnetic field or radiation sensitive sensor elements, in particular, are employed in the realization of such sensor devices, which are utilized to record measured values, like e.g. path, angle, position, speed, rpm, and so forth. These elements are made to induce electric output signals dependent on magnetic fields or radiation, through actuation by appropriate field or radiation transmitting means. Depending on the configuration of the sensor device, the desired measured physical value is then derived from the output signals, which can, for example, concern the position of the field-inducing means in relation to a reference position, or the speed of a scaling element that causes a modulation of the received electromagnetic radiation through its movement relative to the sensor device. This measured quantity is then sent back via an output line to an electronic control as a digital signal at a fixed level.

An example of a sensor device of the specified type is the device forming the state of the art in DE 41 33 837 C2, for measuring the rpm of a toothed wheel.

This state of the art employs a Hall generator, which produces an output voltage proportionate to the field intensity of that part of the magnetic field that charges it. In the configuration at hand, the field of a permanent magnet charges the Hall generator with constant field intensity. A ferromagnetic wheel that turns in front of the sensor modulates the field intensity at the site of the Hall generator, and also modulates its output voltage in phase with the alternating teeth and gashes. The absolute peak of the output voltage, as well as the modulation amplitude, is influenced by many factors such as the intensity of the magnetic field, temperature, and distances between magnet, generator, toothed wheel, etc. The digital signal produced by the evaluation circuit, by means of a comparator, among other things, with variable circuit threshold, represents the modulation frequency of the Hall voltage and, with that, the rpm of the wheel.

This sensor device delivers reliable information as to the rpm of the wheel over a broad tolerance band of the named influencing factors. A drawback, however, exists in that the output signal does not allow any inference as to what state the tolerance band is in, i.e. which tolerance reserves are still available, before the sensor device fails.

A further example of a sensor device represents a distance measuring device based on a magnetostrictive sensor principle. Such a measuring configuration, as is described, for example, in U.S. Pat. No. 5,334,933, consists essentially of a stretched-out acoustic delay line, made of ferromagnetic material, that exhibits a magnetostrictive effect, a sensor head that seals, the line end and that contains the measuring and evaluating electronics and a permanent magnet that is provided along the line and is capable being adjusted.

In this arrangement the distance measurement is performed by determining the position of the permanent magnet, respective to the sensor head along the delay line. For this purpose, the delay line is charged with an electrical current impulse, and a time measuring process is initiated. The magnetic field caused by this current impulse works alternately, at the site of the permanent magnet and with the magnet field, in such a way that a voltage condition is achieved in the delay line that is carried in the form of an acoustic torsion impulse along the delay line, which occurs with the sound velocity typical for the material. The acoustic torsion impulse is converted to an equivalent electrical signal, which is sent to a comparator that produces an output signal that ends the time measurement if a threshold value is surpassed.

The established time is proportional to the distance to be measured so that the sought measuring result can be output in digital or analog coded form through the electronics in the sensor head.

Since the amplitude of the torsion impulse and thus also the electrical signal produced in the sensor head become less intense, it is necessary to adjust the threshold value for the comparator, for example as described in the quoted patent.

A control of the absolute level of the electrical signal, as would be necessary for the estimation of the tolerance situation of the entire system, in particular with respect to a sufficient signal-to-noise ratio, is not possible with the currently used sensor devices of this type.

The task of the invention at hand is thus to further develop senor devices of the named type so that information for evaluating the actual tolerance situation is accessible at all times.

This is accomplished in that, aside from the primary output signal representing the measured value, another measured physical parameter - which occurs in the sensor and is used in order to determine the desired measuring parameter, and the value of which permits conclusions concerning the tolerance situation of the system—is made available as a secondary signal for subsequent control and testing devices.

Such a parameter is given as a rule by the direct output signal of the respective sensor element being used.

Further embodiments and useful developments of the subject according to the invention appear in the description of the embodiments shown in the illustration.

DETAILED DESCRIPTION OF THE PREFERRED EMBODIMENT(S)

Figure 1:
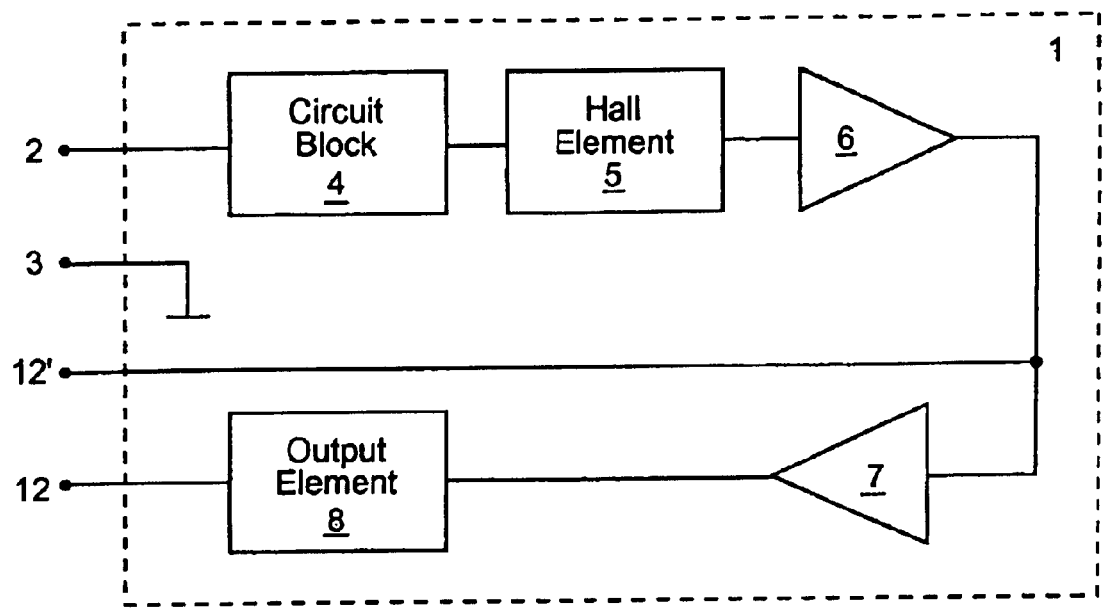
FIG. 1 is a schematic representation of a circuit arrangement Hall-effect rpm sensor device further developed according to the invention.

As can be seen in FIG. 1, a circuit arrangement 1 of a Hall effect rpm sensor feeding in supply voltage UB, and a connection 3 for connection with a reference (ground) potential. Hall element 5 is supplied appropriate voltage, matched to one of its requisites, through a safety circuit and a voltage regulator, which includes circuit block 4. The Hall element—not presented here—is located in a physical working connection with a permanent magnet and a ferromagnetic toothed wheel to realize the rpm sensor function.

The output signal of the Hall element is amplified in an amplification element 6, and the amplified signal is then sent, on the one hand, directly to an output 12' and on the other hand also to a comparator element 7, which compares it to a reference value, generates the appropriate digital output signal, and sends it off by way of an output element 8 to digital output 12. The analog signal at output 12' is proportionate to the analog Hall voltage delivered by Hall element 5, and can thus be used, upon recognition of limit values appropriate for reliable function, to determine the available tolerance reserves.

Figure 2:
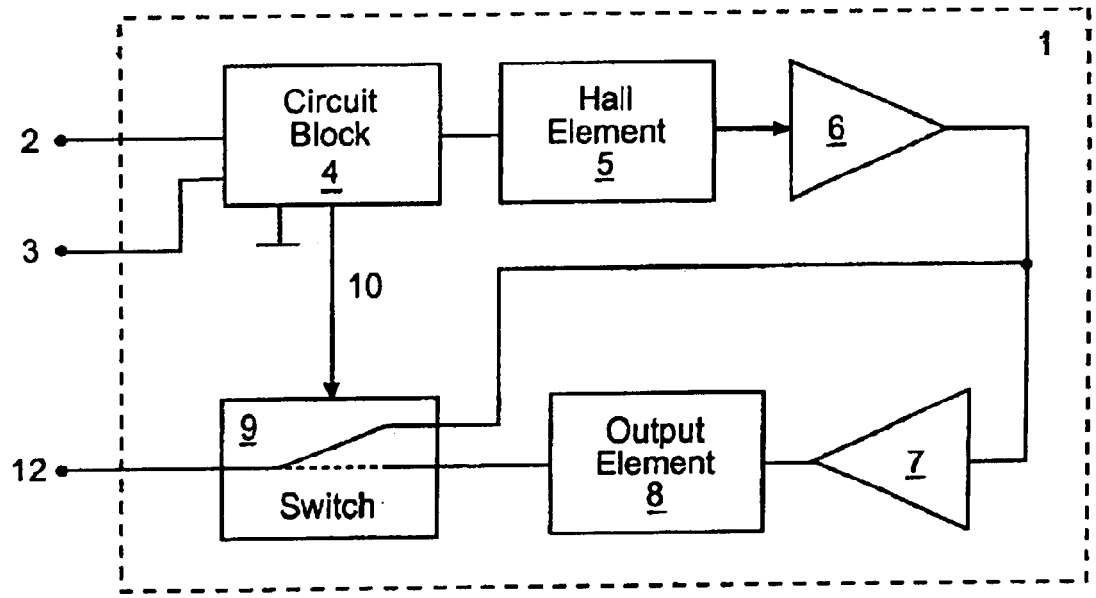
FIG. 2 is a schematic representation of a circuit arrangement Hall-effect rpm sensor device further developed according to a second embodiment of the invention.

The circuit arrangement 1 shown in FIG. 2, of a Hall-effect rpm sensor device according to a second embodiment of the invention, works essentially exactly like the previously described embodiment, so that the description here can be limited to the differences. The most important difference is that an additional output for the analog signal is omitted in this embodiment, since this can be sent out through output 12 for the digital signal as well. The decision, which signal should appear at output 12, results through switch 9, which is part of circuit arrangement 1, and to which output 12 is connected, either with output element 8 for the digital signal, or with the output of amplification element 6, where the amplified analog output signal of output signal of sensor element 5 stands.

In this arrangement, the embodiment and control of switch 9 can be implemented in a multitude of ways, while the embodiment form shown here, utilizes an electronic switch that is controlled by a signal line 10 from voltage supply block 4.

Alternatively, a manually operated electromechanical switch can, of course, also be used, or an electronic switch may be used that can be actuated by remote controls operated by electronic switches located outside the circuit arrangement.

In the embodiment form shown here, the selection may be made e.g. in that, with the supply voltage "poled correctly" i.e. +UB to connection 2 and ground to connection 3, the normal sensor function is performed with a digital output signal, while with the voltage supply "wrongly poled," the potentials are switched within voltage supply block 4, so that the proper operating voltage is available for the subsequent components, while at the same time signal line 10 is influenced via switch 9 in such a manner that the amplified analog output signal of Hall-element 5 appears at output 12. Thus, for testing purposes for example, an operating mode can be set, in which the analog Hall signal is available at output 12, through deliberate pole reversal of the supply voltage.

Figure 3:
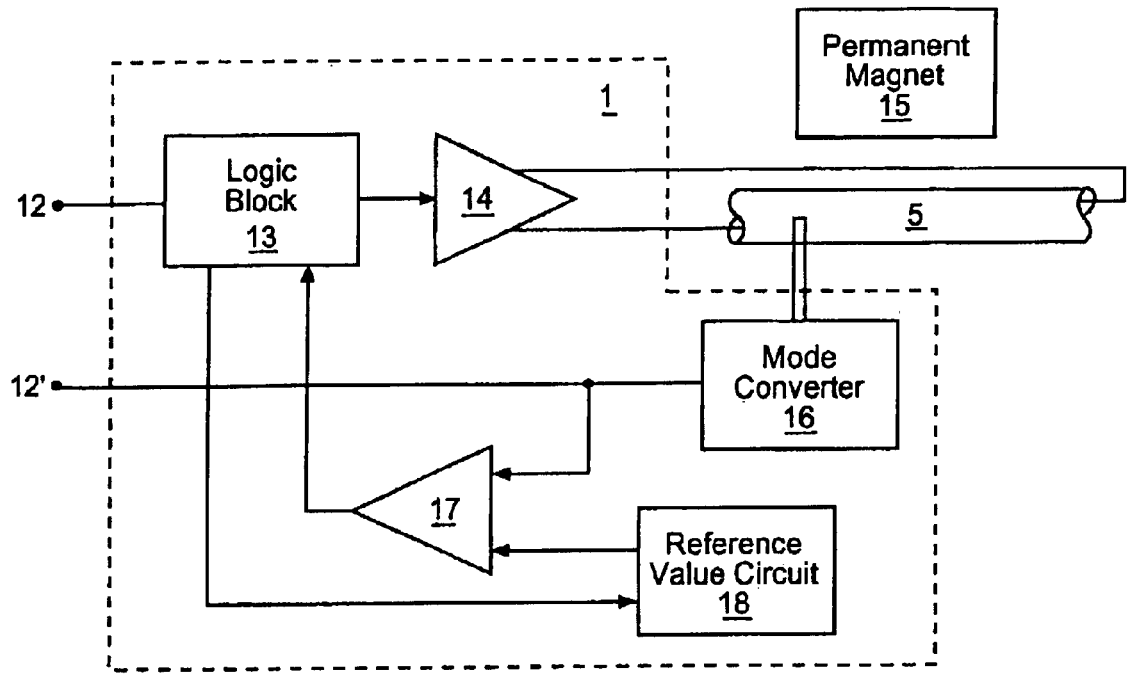
FIG. 3 is a schematic representation of a magnetostrictive distance measuring device further developed according to the first embodiment of the invention.

The magnetostrictive distance measuring device, shown in FIG. 3, is controlled by logic block 13, which is part of circuit arrangement 1 and performs different control and measurement functions. Thus logic block 13 induces pulse generator 14 to charge ferromagnetic delay line 5 with a current impulse at the beginning of a measurement. When the mechanical torsion impulse, started through this at the site of permanent magnet 15, arrives at the sensor side of the delay line, it is converted to an electrical signal by mode converter 16. This electrical signal is compared, in comparator 17, to a reference voltage delivered by reference value circuit 18 and the reference voltage can be influenced by logic block 13. When the electric output of mode converter 16 exceeds the reference voltage, comparator 17 gives off an impulse signal to logic block 13, so that the time measurement that started with generation of the current impulse, ends. The time measured, or the already established distance value therefrom, is given out as a digital coded signal at output 12.

However, the output signal of mode converter 16 is additionally led to an analog output 12', at which it stands available for testing purposes, or for evaluation of the tolerance situation.

Figure 4:
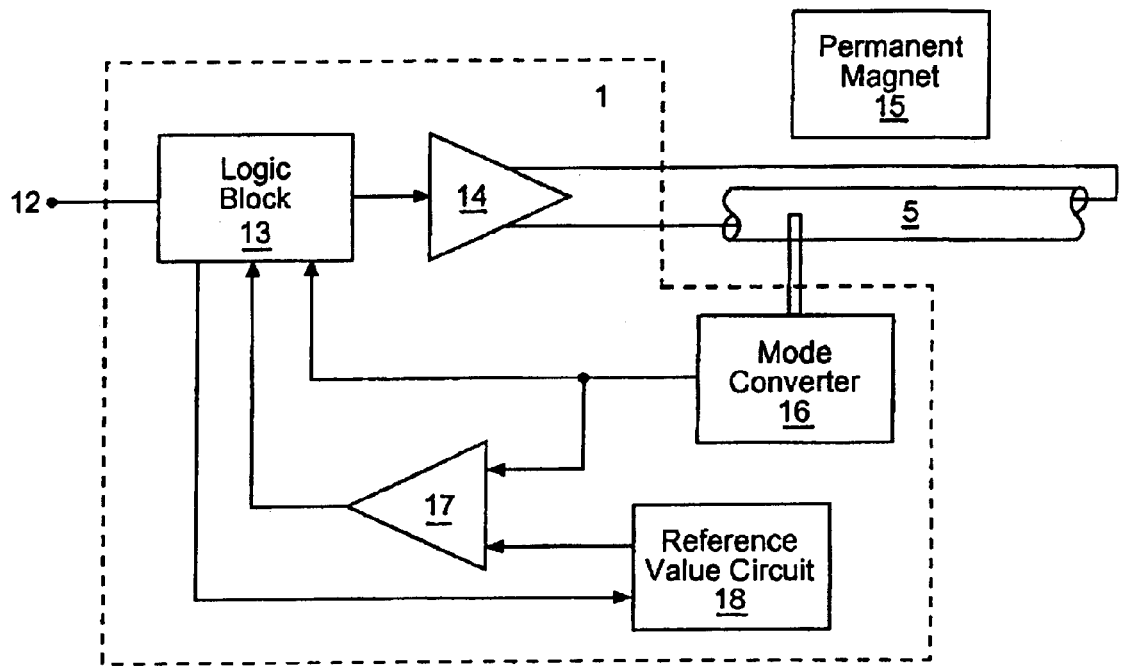
FIG. 4 is a schematic representation of a magnetostrictive distance measuring device further developed according to a third embodiment of the invention.

As an alternative to this, an embodiment form of the described magnetostrictive distance measuring device is shown in FIG. 4 that corresponds with a third embodiment of the invention.

Here, the secondary output signal is not sent via a separate output, but is routed to logic block 13, which also encompasses the function of a signal-mixing element in this embodiment and makes the output signal, which represents the primary as well as the secondary signal, available at output 12.

The overlapping of the two signals necessary for this can occur in a multitude of ways. Thus, for example, the primary signal can be DC voltage, and the secondary signal can be overlaid as AC voltage, or the other way around. Likewise a digital or a frequency modulated signal can also be overlapped over a DC voltage.

The only condition for the use of this embodiment form is that a subordinate controlling apparatus, which is provisioned to receive output signals, must be capable of reseparating the two signals.

Of course, both with the rpm sensor device and with the magnetostrictive distance measuring device, configurations are only possible in the other respective manner shown in the examples, just as the described measures can be applied to a large number of other measurement devices, not explicitly mentioned here.

What is claimed is:

1. A sensor device for measuring a physical value, the sensor device comprising:
   a sensor element for generating an output signal in response to measuring a physical value;
   a processor operable with the sensor element for comparing the output signal to a reference signal in order to generate a primary signal indicative of the measured physical value, the processor further operable with the sensor element for generating a secondary signal indicative of the operating condition of the sensor element based on the output signal; and
   a logic block operable for receiving the primary and secondary signals from the processor, wherein the logic block includes a signal-mixing element that overlays the primary and secondary signals to form a combined primary and secondary signal, the logic block having an output for outputting the combined primary and secondary signal.

2. The sensor device of claim 1 wherein:
   the sensor element generates an output signal in response to measuring a magnetic field.

3. The sensor device of claim 2 wherein:
   the sensor element is a Hall-effect sensor element.

4. The sensor device of claim 2 wherein:
   the sensor element exhibits a magnetostrictive effect.

5. The sensor device of claim 2 wherein:
   the sensor element includes a ferromagnetic body exhibiting a magnetostrictive effect.

6. The sensor device of claim 1 wherein:
   the measured physical value is a distance.

7. The sensor device of claim 1 wherein:
the measured physical value is a position.

8. The sensor device of claim 1 wherein:
the measured physical value is an angle.

9. The sensor device of claim 1 wherein:
the measured physical value is revolutions per minute.

10. The sensor device of claim 1 wherein:
the primary signal is a digital primary signal and the secondary signal is an analog secondary signal.

* * * * *